United States Patent
Falk et al.

(10) Patent No.: US 11,244,038 B2
(45) Date of Patent: Feb. 8, 2022

(54) PROVING AUTHENTICITY OF A DEVICE WITH THE AID OF A PROOF OF AUTHORIZATION

(71) Applicant: SIEMENS AKTIENGESELLSCHAFT, Munich (DE)

(72) Inventors: Rainer Falk, Poing (DE); Steffen Fries, Baldham (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 435 days.

(21) Appl. No.: 16/088,855

(22) PCT Filed: Feb. 15, 2017

(86) PCT No.: PCT/EP2017/053376
§ 371 (c)(1),
(2) Date: Sep. 27, 2018

(87) PCT Pub. No.: WO2017/167498
PCT Pub. Date: Oct. 5, 2017

(65) Prior Publication Data
US 2020/0302047 A1  Sep. 24, 2020

(30) Foreign Application Priority Data
Mar. 30, 2016  (DE) ...................... 10 2016 205 198.9

(51) Int. Cl.
G06F 21/44  (2013.01)
H04L 9/30  (2006.01)
(Continued)

(52) U.S. Cl.
CPC ................ *G06F 21/44* (2013.01); *H04L 9/30* (2013.01); *H04L 9/3242* (2013.01); *H04L 9/3278* (2013.01); *H04W 12/069* (2021.01)

(58) Field of Classification Search
CPC ......... G06F 21/44; H04L 9/30; H04L 9/3242; H04L 9/3278; H04L 9/321; H04L 9/3247;
(Continued)

(56) References Cited

U.S. PATENT DOCUMENTS 8,667,265 B1 * 3/2014 Hamlet ................. H04L 9/0866
713/150
2008/0082449 A1 * 4/2008 Wilkinson ............ H04L 9/0825
705/59
(Continued)

FOREIGN PATENT DOCUMENTS

DE       102013203101 A1     8/2014

OTHER PUBLICATIONS

International Search Report dated Mar. 28, 2017 for PCT/EP2017/053376.
International Search Report for PCT/EP2017/053376.

*Primary Examiner* — Jeffrey C Pwu
*Assistant Examiner* — Mayasa A. Shaawat
(74) *Attorney, Agent, or Firm* — Schmeiser, Olsen & Watts, LLP

(57) ABSTRACT

Provided is a method for proving authenticity of a device with the aid of a proof of authorization of the device, wherein the proof of authorization is provided in a first step and the integrity of identity details of the proof of authorization can be checked on the basis of a digital signature of a proof of authorization issuer, and wherein the proof of authorization has an item of hardware authentication information, and affiliation of the proof of authorization to the device is proved in a second step by means of a hardware secret of the device associated with the hardware authenti- (Continued)

Figure 1:
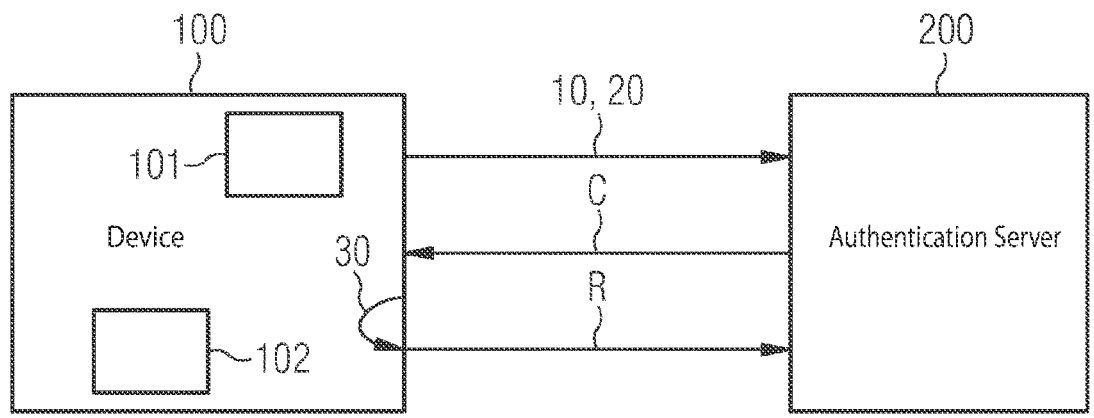

cation information. Two-factor authentication is therefore enabled, which authentication ties authentication of the device, in particular, to the fact that a hardware-specific secret is used for the check.

16 Claims, 1 Drawing Sheet

(51) Int. Cl.
*H04L 9/32* (2006.01)
*H04W 12/069* (2021.01)

(58) Field of Classification Search
CPC ............... H04L 9/3263; H04L 9/3271; H04L 63/0823; H04W 12/0609
See application file for complete search history.

(56) References Cited

U.S. PATENT DOCUMENTS

| | | | |
|---|---|---|---|
| 2009/0044011 A1* | 2/2009 | Russell | G06F 21/604 713/168 |
| 2009/0083833 A1* | 3/2009 | Ziola | H04L 9/3278 726/2 |
| 2014/0189890 A1 | 7/2014 | Koeberl et al. | |

* cited by examiner

PROVING AUTHENTICITY OF A DEVICE WITH THE AID OF A PROOF OF AUTHORIZATION

CROSS-REFERENCE TO RELATED APPLICATIONS

This application claims priority to PCT Application No. PCT/EP2017/053376, having a filing date of Feb. 15, 2017, based on German Application No. 10 2016 205 198.9, having a filing date of Mar. 30, 2016, the entire contents both of which are hereby incorporated by reference.

FIELD OF TECHNOLOGY

In industrial automation installations, security infrastructures involve proofs of authorization or security credentials, such as, for example, digital certificates, being used that are issued by certification entities or what are known as certification authorities. In this context, a device within the automation installation uses a digital certificate to identify itself to a third party. The certificate uses a signature from the certification entity to confirm that the details that the certificate contains about, by way of example, the identity or a public key of the device are correct.

BACKGROUND

Technical devices can be denoted by means of an identification plate for the purpose of explicitly denoting the hardware. By way of example, security features such as a hologram can be integrated into the identification plate. Additionally, data can be introduced into the device during production, said data also being able to be queried during use. Provided that there is a data communication link between a device and an inspection center, it can be used to perform cryptographic authentication.

It is generally known that digital certificates are stored that have a public key of a device and a piece of identification information for the device. In this context, it is also known that manufacturer certificates are used in order to put in place operator certificates in a protected manner. In this context, established authentication modules have a piece of identification information that is stipulated by the manufacturer of the authentication module.

The laid-open specification DE 102013203101 A1 has disclosed the practice of having further parameters or attributes added to a certificate request by an intermediate entity and therefore of making an extended certificate request.

There is a need to allow reliable authentication of technical devices to inspection centers by using proofs of authorization or security credentials such as, in particular, digital certificates. In this context, the integrity of the presented proof of authorization and the authenticity of the unit presenting the certificate are intended to be ensured.

SUMMARY

An aspect relates to a method for proving an authenticity of a device with the aid of a proof of authorization of the device,
wherein a first step involves the proof of authorization being provided and the integrity of identity details of the proof of authorization being checkable on the basis of a digital signature of a proof of authorization issuer, wherein the proof of authorization has a piece of hardware authentication information and a second step involves an association of the proof of authorization with the device being proved by means of a hardware secret of the device that is associated with the hardware authentication information.

A device is intended to be understood to mean, by way of example, a field device, in particular a field device provided within an automation installation. A proof of authorization is understood to mean what is known as a security credential that has data for authentication in a data structure, for example in the form of a standardized data structure, for example designed as a digital certificate.

By way of example, a proof of authorization in the form of a digital certificate contains an explicit name of a proof of authorization issuer or a certification entity, an explicit name or identifier of the device, for example assigned by a manufacturer, a public key of the device and further details such as, by way of example, time statements and optional extensions. Moreover, a digital certificate has a signature of the proof of authorization issuer. A cryptographic method and a private key of the proof of authorization issuer are used to form the digital signature for the identity details and optional extensions indicated in the certificate.

The proof of authorization issuer is intended to be understood to mean in particular the certification entity of a security infrastructure, for example of a PKI, short for public key infrastructure. What is known as the certificate authority in this context is the trustworthy entity in a system, whose public key is known and whose private key needs to be stringently protected from spying or manipulation.

In the first step, a check on the proof of authorization is therefore performed with the aid of a digital signature and the identity details. In the second step, the hardware authentication information is taken from a, in particular already checked, proof of authorization and additionally a hardware authentication mechanism is used. The two steps can also be performed in reverse chronological order.

The hardware authentication information in the proof of authorization is provided as additional authentication information that proves an association of the proof of authorization with the device presenting the proof of authorization. To this end, a hardware secret is provided on the device, said hardware secret being associated with the hardware authentication information and in particular only being known to the device or ascertainable by the device.

Therefore, a two-factor authentication is made possible that links an authentication of the device in particular to a hardware-specific secret being used for the check. This should be possible only by the original, unmanipulated device. This allows, by way of example, a digital certificate for a device to have not only the public device key, which is possibly directly part of the identity details, but additionally another, second piece of authentication information for improved hardware authentication.

The hardware secret and/or the hardware authentication information differ from the identity details or from key material to which the identity details refer, which means that the additional authentication in the second step achieves increased security. In particular, the hardware authentication information, as second authentication information besides information contained in the proof of authorization or certificate, refers not to a public key already used for the certificate check but rather to a hardware secret that differs from the identity details.

By way of example, the proof of authorization forms a manufacturer certificate that is individually stored in the device in a production phase. The manufacturer certificate and an associated private key, which is the hardware secret, are stored in a hardware security module of the device or in the firmware, for example.

To prove authenticity, the device can thus initiate or perform two authentication steps. Firstly, the usual presentation of a proof of authorization takes place, wherein the signature that the proof of authorization contains for the certification center and the public key of the certification center are used to check whether the details that the certificate contains for the identity, in particular for an ID of the device and for a public key of the device, have been authenticated by the certification entity. Additionally, a second authentication takes place, involving the hardware authentication information being used to verify, or have proved, the knowledge or possession of a hardware secret by the device. Therefore, not only the integrity of the presented digital certificate but additionally the tying of the digital certificate to the center presenting the certificate, in this case the device, are achieved.

The extended authentication of a hardware device certificate stipulated by the manufacturer advantageously provides assistance for a manipulation-protected tie to a configurable device certificate introduced by the operator, for example. Key lengths or crypto algorithms for device authentication within the framework of the usual certificate-based device authentication are independent of key lengths and the configuration of crypto algorithms for hardware authentication of the device on the basis of the hardware authentication information that the proof of authorization contains.

According to one configuration, the hardware authentication information is designed as an identifier of a hardware authentication module. Therefore, a module on the device that is provided specifically for two-factor or second-factor device authentication purposes can be used to provide a unit performing the authentication with the hardware authentication information.

According to one embodiment, the identifier is designed as an identifier or a serial number of a hardware authentication circuit or as a value or hash value of a public key of the hardware authentication module or as a value or hash value of a certificate of a hardware authentication module or as an identifier of a symmetric key put onto the device in a production phase or as an index of a symmetric key table put onto the device in a production phase or of a physical unclonable function provided on the device or as an identifier for a key table.

Therefore, the identifier is used to present a description of a device authentication factor in the proof of authorization or in the digital certificate. The identifier therefore acts as a pointer or index to an authentication feature of the device.

According to one configuration, proving the association by means of the hardware secret associated with the hardware authentication information involves a symmetric or asymmetric authentication method. Depending on whether the hardware authentication information points to a symmetric or asymmetric key pair, a symmetric or asymmetric authentication is effected. By way of example, an identifier of a symmetric key put onto the device during production acts such that a challenge-response method is triggered by the authenticating unit, which involves a correct response expected by the inspection center being able to be computered by the device only by means of the symmetric key. The identifier can further refer to a key table, from which challenge-response requests can then be generated using an index statement in the hardware authentication information. Using the respective key, the device can in turn generate the fitting response. Only if the response fits is the second authentication then likewise successful. In a variant, the key table is updated in the device by an operator, for example.

According to one configuration, a physical unclonable function replaces the action of the symmetric key. The certificate may then have an index of a table of challenge-response values of the physical unclonable function PUF entered in it.

If a piece of hardware authentication information is provided that refers to a public key of the device or hardware authentication module of the device, either directly or in turn by means of a certificate, then the hardware authentication method—just like the method for checking identity details already—is likewise performed asymmetrically. By way of example, the TLS protocol, short for Transport Layer Security protocol, is used. A response expected for a challenge is then generated by means of a private or secret key of the device or of the authentication module. Again, tying up the certificate to the unit presenting the certificate is made possible by means of an asymmetric two-factor authentication.

According to one configuration, the hardware secret is designed as a private or secret key or physical unclonable function. The hardware secret is chosen in a manner fitting the authentication method.

According to one configuration, the hardware secret is stored in the memory of the device. When a physical unclonable function is used, it acts as the memory.

According to one configuration, the hardware authentication information is incorporated into an attribute certificate referring to a further proof of authorization, wherein the identity details are checkable by means of the further proof of authorization. Therefore, a tie between the certificate and the hardware can easily be updated, in particular in cases in which parts of a device are replaced that are critical for the tie. In such cases, advantageously, only the attribute certificate needs to be renewed.

According to one development, the proof of authorization is produced by the proof of authorization issuer in response to a proof of authorization request, and the proof of authorization request has the hardware authentication information as an extension. In order to obtain a digital certificate from a certification center, for example, a certificate request is sent, what is known as a certificate signing request, CSR for short. This has the identity details that need to be confirmed by the certification entity. The hardware authentication information can advantageously be incorporated to a CSR as an extension.

According to one development, the hardware authentication information is incorporated into the proof of authorization request by the device or by a component connected between the device and the proof of authorization issuer, in particular a registration center or registration authority. A registration authority can in this case perform additional functions such as, in particular, inspecting the content of the proof of authorization request before it is forwarded to the certification entity. In particular, the registration authority can achieve this by using the hardware authentication information to perform a device authentication.

The following further relates to an apparatus for proving an authenticity of a device with the aid of a proof of authorization of the device, having means
    for providing the proof of authorization, wherein the integrity of identity details of the proof of authorization is checkable by means of a public key of a proof of authorization issuer, and the proof of authorization has a piece of hardware authentication information, for proving an association of the proof of authorization with the device by means of a hardware secret of the device that is associated with the hardware authentication information.

To prove the association of the proof of authorization with the device, a hardware authentication mechanism is used, which differs from mechanisms useable for checking the proof of authorization. In particular, the device has means for performing a challenge-response mechanism.

According to one configuration, the apparatus further has a memory for storing the hardware secret.

According to one development, the apparatus further has an interface to a proof of authorization issuer, wherein the proof of authorization issuer is provided with a proof of authorization request, having the identity details of the device and also the hardware authentication information, and the proof of authorization issuer forms a digital signature for the identity details of the device and the hardware authentication information. The apparatus may in this case be the device itself, which is connected to a certification entity or certificate authority via the interface. Similarly, as an alternative, the apparatus can consist of a device, for example a field device, and a registration authority, the registration authority processing the certificate request message before forwarding it to the certificate authority.

According to one development, a registration center is provided for incorporating the hardware authentication information into a proof of authorization request. In this case, the proof of authorization request is generated by the device and contains the necessary pointers to the second authentication option, for example an index to a locally stored symmetric key.

According to one development, a registration center is provided for inspecting the hardware authentication information with the aid of the associated hardware secret and for forwarding a proof of authorization request to a proof of authorization issuer in the event of successful inspection.

According to one configuration, a registration center is provided for producing an extended proof of authorization request, wherein in particular the hardware authentication information is readable from a database. This is advantageous particularly if the device has not incorporated the option of hardware authentication into the proof of authorization request. However, it requires the registration center to have the necessary information for the hardware authentication information available in the form of a database, for example. Following a successful check on the hardware authentication information with the aid of the associated hardware secret from the database, the proof of authorization request from the device is added to by the registration center as appropriate and forwarded to a proof of authorization issuer.

The means can be realized and embodied in software, hardware or in a combination of software and hardware. As such, the steps performed by the means may be stored as program code on a storage medium, in particular a hard disk, CD-ROM or a memory module, with the individual instructions of the program code being read and processed by at least one computation unit, comprising a processor.

BRIEF DESCRIPTION

Figure 2:
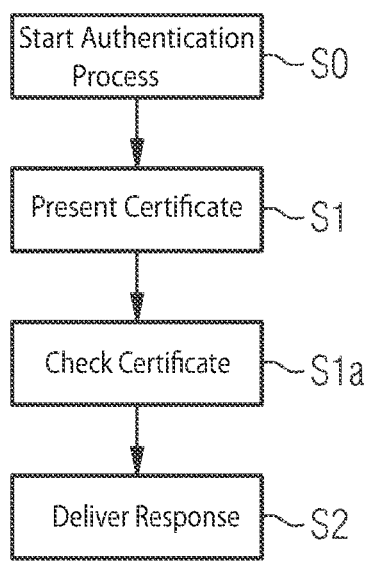

Some of the embodiments will be described in detail, with references to the following Figures, wherein like designations denote like members, wherein:

FIG. 1: shows a schematic view of a system for proving an authenticity of a device according to one exemplary embodiment of the invention;

FIG. 2: shows a flowchart of a method for proving an authenticity of a device according to a further exemplary embodiment of the invention.

DETAILED DESCRIPTION

FIG. 1 schematically shows a device 100 performing an authentication to an inspection unit or an authentication server 200. By way of example, the device 100 is an automation device that is supposed to prove its authenticity within an industrial automation installation to the authentication server 200, for example, in a manipulation-protected manner. The authentication is supposed to be performed in a certificate-protected manner in this case. For this purpose, it is possible to resort to an existing certification infrastructure that equips the device 100 with certificates signed by a certification entity. Public keys of the certification entity are in particular known to the authentication server 200, which means that it is possible to check whether the digital signature of the certification entity for data that the certificate contains can confirm integrity of these data. For this purpose, the device 100 transmits a certificate as proof of authorization 10 to the authentication server 200. The certificate contains the explicit name of the certification entity, an explicit name of the device 100, a public key of the device 100, a time statement stipulating the validity of the certificate and the digital signature of the certification entity for the cited data, for example.

The signature was formed by applying the private key of the certification entity to the hash value of the details transmitted in the certificate. The public key of the certification entity is able to be used to ascertain the hash value in the reverse step and to compare it with the result of a hash value formation for the details that the certificate contains. Additionally, the certificate contains a piece of hardware authentication information 20.

The hardware authentication information 20 points to a hardware secret 30 that needs to be used in order to prove an association of the certificate with the device 100. In particular, a certificate or a public key of a hardware authentication module, or values derived therefrom by means of hash value formation, is used to transmit the information regarding which private or secret key is intended to be used in a subsequent authentication. A serial number of a hardware authentication circuit or a pointer referring to the entry in a key table by means of an index can also advantageously be used in order to transmit the necessary information for an additional hardware authentication to the authentication server 200. The authentication server 200 takes the received hardware authentication information 20 as a basis for deriving a challenge C or challenge message that is transmitted to the device 100. In particular, when a PUF is used, a number of challenge-response pairs are stored on the authentication server for the device 100 authenticating itself. The challenge C from one of these challenge-response pairs is chosen on the basis of the index. Depending on the chosen hardware authentication method, the authentication server can also compute the response autonomously and, on the basis thereof, perform a comparison with the received response.

Using the hardware secret 30 stored in a non-volatile memory 102 of the device 100, the device 100 produces a response R with the aid of a cryptographic method. In this case, the hardware secret 30 is used as a symmetric secret key or an asymmetric private secret key. If the response R returned by the device 100 is consistent with the challenge-response pair of the chosen challenge C, then the authentication server 200 can confirm not only the integrity of the data presented in the certificate about the identity and the public key of the device 100 but also the authenticity of the sender of the certificate, i.e. the tie between certificate and hardware of the device 100.

FIG. 2 schematically depicts how a flowchart of an authentication process according to a further exemplary embodiment of the invention proceeds. In an initial step S0, an authentication server starts the authentication process by means of a TLS protocol, for example. A device then presents its certificate within the framework of the TLS protocol in step S1, said certificate containing not only the usual identity details but also an additional piece of hardware authentication information. Subsequently, in step S1a, the authentication server checks the certificate using the public key of a trustworthy certification entity that has issued the certificate for the device.

On the basis of the certificate and in particular using the hardware authentication information, the authentication server now generates a challenge, which is transmitted to the device. By way of example, the challenge-response method is performed between authentication server and device by using an http-Digest protocol, which may be based on the already established TLS connection. In this case, the authentication server requests a fingerprint of a password, for example. The pointer to the applicable password is delivered by the hardware authentication information in the certificate and is therefore available on both sides. If the device also has the password self-available, then a response that the authentication server expects on the basis of the received hardware authentication information can be generated and delivered to the authentication server in step S2. Accordingly, a correctly presented response results in the device being rated as authentic.

It is further likewise conceivable for the response to be sent automatically without prior request by the authentication server. By way of example, the challenge can be delivered alongside, so that the authentication server can check the compatibility of challenge and response and moreover the compatibility of challenge and hardware authentication information.

An identity certificate based on X509 is depicted below for the purposes of illustration.

```
Certificate::=                  SEQUENCE {
tbsCertificate                      TBSCertificate,
SignatureAlgorithm                  AlgorithmIdentifier,
SignatureValue                      BIT STRING
}
TBSCertificate ::= SEQUENCE{
version                             [0] Version must be v3,
serialNumber                        CertificateSerialNumber,
signature                           AlgorithmIdentifier,
issuer                              Name,
validity                            Validity,
subject                             Name,
subjectPublicKeyInfo                SubjectPublicKeyInfo,
issuerUniqueID                      [1] IMPLICIT UniqueIdentifier
                                    OPTIONAL,
                                        - - If present, version MUST be v2 or v3
subjectUniqueID                     [2] IMPLICIT UniqueIdentifier
                                    OPTIONAL,
                                    --      If present, version MUST be v2 or
                                    v3
extensions                          [3] EXPLICIT Extensions
                                    OPTIONAL
                                            -- If present, version MUST
                                            be v3
Validity ::=    SEQUENCE {
notBefore                               Time,
notAfter                                Time
}
Time ::= CHOICE {
utcTime                             UTCTime
generalTime                         GeneralizedTime
}
```

Further, an attribute certificate based on X509 is depicted for the purpose of illustration.

```
AttributeCertificate ::=            SEQUENCE {
Acinfo                              AttributeCertificateInfo,
signatureAlgorithm                  AlgorithmIdentifier,
signatureValue                      BIT STRING
}
AttributeCertificateInfo ::=        SEQUENCE {
version                             AnCertVersion - -Lversion is
                                    v2,
holder                              Holder,
issuer                              AttCertIssuer,
signature                           AlgorithmIdentifier,
```

```
serialNumber            CertificateSerialNumber,
attrCertValidityPeriod  AttCertValidityPeriod,attributes
                        SEQUENCE OF Attribute,
                        issuerUniqueID
                        UniqueIdentifier OPTIONAL,
extensions              Extensions OPTIONAL
}
Attribute::= SEQUENCE {
Type                    AttributeType,
values                  SET OF AttributeValue
                        --at least one value reqrd,
}
AttributeType:: = OBJECT IDENTIFIER
AttributeValue:: = ANY DEFINED BY AttributeType
```

For the purpose of describing an authentication module of a device, a piece of hardware authentication information as an extension in one of the certificates described above can have the following appearance:

```
id-on-deviceAuthModule OBJECT IDENTIFIER ::= { id-on 4 }
DeviceAuthModule ::= SEQUENCE {
    Type   Name         -- alphanumerical description,
    SN     Name         -- alphanumerical serial
                        -- number,
    alg    Name         -- alphanumerical description
                        -- of algorithm,
authRef BIT STRING      -- authentication reference,
                        -- e.g. a public key, a
                        -- hardware authentication
                        -- module's certificate hash
                        -- key identifier of a
                        -- symmetric key
                        -- Identifier for secret table
}
```

The extension can be set as critical in the certificate, which means that the two-factor authentication must necessarily be performed using the hardware authentication information. A further possibility is for coding to be used, for example, to stipulate the certificate is to be accepted as valid only if the two-factor authentication indicated in the certificate has been performed successfully. This means that the public key confirmed by the certificate is accepted as a valid key only if the two-factor authentication has likewise been performed successfully.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for proving an authenticity of a device with the aid of a proof of authorization of the device, the method comprising:
providing the proof of authorization and checking an integrity of identity details of the proof of authorization on a basis of a digital signature of a proof of authorization issuer, wherein the proof of authorization has a piece of hardware authentication information; and
associating the proof of authorization with the device being proved by means of a hardware secret of the device that is associated with the hardware authentication information;
wherein the hardware authentication information is incorporated into an attribute certificate referring to a further proof of authorization, wherein the identity details are checkable by means of the further proof of authorization, and wherein the hardware authentication information deviates from the identity details or from key material referring to the identity details.

2. The method as claimed in claim 1, wherein the hardware authentication information is an identifier of a hardware authentication module.

3. The method as claimed in claim 2, wherein the identifier is selected from the group consisting of: a serial number of a hardware authentication circuit, a value or hash value of a public key of a hardware authentication module, a value or a hash value of a certificate of the hardware authentication module, an identifier of a symmetric key put onto the device in a production phase, an index of a symmetric key table put onto the device in a production phase or of a physical unclonable function provided on the device, and an identifier for a key table.

4. The method as claimed in claim 1, wherein proving the association by means of the hardware secret associated with the hardware authentication information involves a symmetric or asymmetric authentication method.

5. The method as claimed in claim 1, wherein the hardware secret is designed as a private or secret key or physical unclonable function.

6. The method as claimed in claim 1, wherein the hardware secret is stored in a memory of the device.

7. The method as claimed in claim 1, wherein the hardware authentication information is incorporated into an attribute certificate referring to a further proof of authorization, wherein the identity details are checkable by means of the further proof of authorization.

8. The method as claimed in claim 1, wherein the proof of authorization is produced by the proof of authorization issuer in response to a proof of authorization request, and the proof of authorization request has the hardware authentication information as an extension.

9. The method as claimed in claim 8, wherein the hardware authentication information is incorporated into the proof of authorization request by the device or by a component connected between the device and the proof of authorization issuer, in particular a registration center.

10. An apparatus for proving an authenticity of a device with the aid of a proof of authorization of the device, the apparatus comprising:
a processor and a memory, the processor configured to:
provide the proof of authorization, wherein the integrity of identity details of the proof of authorization is checkable by means of a public key of a proof of authorization issuer, and the proof of authorization has a piece of hardware authentication information; and prove an association of the proof of authorization with the device by means of a hardware secret of the device that is associated with the hardware authentication information;

wherein the hardware authentication information is incorporated into an attribute certificate referring to a further proof of authorization, wherein the identity details are checkable by means of the further proof of authorization, and wherein the hardware authentication information deviates from the identity details or from key material referring to the identity details.

11. The apparatus as claimed in claim 10, further having a memory for storing the hardware secret.

12. The apparatus as claimed in claim 10, further having an interface to a proof of authorization issuer, wherein the proof of authorization issuer is provided with a proof of authorization request, having the identity details of the device and also the hardware authentication information, and the proof of authorization issuer forms a digital signature for the identity details of the device and the hardware authentication information.

13. The apparatus as claimed in claim 10, wherein a registration center is provided for incorporating the hardware authentication information into a proof of authorization request.

14. The apparatus as claimed in claim 10, wherein a registration center is provided for inspecting the hardware authentication information with the aid of the associated hardware secret and for forwarding a proof of authorization request to a proof of authorization issuer in the event of successful inspection.

15. The apparatus as claimed in claim 10, wherein a registration center is provided for producing an extended proof of authorization request, wherein the hardware authentication information is readable from a database.

16. The method of claim 4, wherein proving the association by means of the hardware secret associated with the hardware authentication information involves a challenge-response based authentication method.

* * * * *